(12) United States Patent
Nitta et al.

(10) Patent No.: US 6,345,105 B1
(45) Date of Patent: Feb. 5, 2002

(54) AUTOMATIC DOOR SYSTEM AND METHOD FOR CONTROLLING AUTOMATIC DOOR

(75) Inventors: Yasuhiko Nitta; Jun-ichi Kondo, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/246,714

(22) Filed: Feb. 9, 1999

(30) Foreign Application Priority Data

Sep. 1, 1998 (JP) .......................... P10-246958

(51) Int. Cl.$^7$ ................................. G06K 9/00

(52) U.S. Cl. ....................... 382/100; 318/466

(58) Field of Search ................ 382/100; 318/286, 318/466, 602, 467, 468, 469, 470; 250/221

(56) References Cited

FOREIGN PATENT DOCUMENTS

| JP | 4-111079 | 4/1992 |
|----|----------|--------|
| JP | 6-86295  | 3/1994 |

*Primary Examiner*—Joseph Mancuso
*Assistant Examiner*—Abolfazl Tabatarai
(74) *Attorney, Agent, or Firm*—Burns, Doane, Swecker & Mathis, LLP

(57) ABSTRACT

In an automatic door system and a method for controlling an automatic door, the automatic door is not opened when a passerby just passes by the door. A data processing device (5) produces a differential image by subtracting an initial image from a detected image on the basis of digital data entered from a subtractor (4), and judges whether a gray-scale shadow is in the differential image or not. When a gray-scale shadow appears in the differential image, the data processing device (5) calculates the maximum width ($X_m$) of the gray-scale shadow in the X direction to compare it with a predetermined threshold value ($X_{th}$). When the maximum width ($X_m$) is equal to the threshold value ($X_{th}$) or more, the data processing device (5) judges that a passerby faces toward an automatic door (1), and outputs a driving control signal (C) for opening the automatic door (1).

25 Claims, 14 Drawing Sheets

AUTOMATIC DOOR SYSTEM AND METHOD FOR CONTROLLING AUTOMATIC DOOR

BACKGROUND OF THE INVENTION

1. Field of the Invention

The present invention relates to an automatic door system of controlling the opening and closing of an automatic door by the presence or absence of a passerby. The invention further relates to a method for controlling an automatic door.

2. Description of Prior Art

FIG. 28 is a schematic diagram of the structure of a conventional automatic door system. An ultrasonic sensor 102 emits ultrasonic waves toward a floor face 103 in the vicinity of the entrance of an automatic door 101. The ultrasonic sensor 102 has a function to detect reflected waves of the emitted ultrasonic waves and to measure a distance between an object reflecting the ultrasonic waves (hereinafter referred to as a "reflecting object") and itself.

When no passer such as a passerby or a vehicle (hereinafter represented by a passerby) is in the vicinity of the entrance of the automatic door 101, the ultrasonic waves emitted from the ultrasonic sensor 102 is reflected from the floor face 103. Detecting the reflected waves, the ultrasonic sensor 102 measures a distance between the reflecting object and itself. A distance between the ultrasonic sensor 102 and the floor face 103 has previously been taught to the ultrasonic sensor 102. When the reflecting object is the floor face 103, the measured distance agrees with the teaching distance. Thus, the ultrasonic sensor 102 identifies the reflecting object as the floor face 103, and judges that no passerby is in the vicinity of the entrance of the automatic door 101. In this case, the ultrasonic sensor 102 does not perform an opening operation of the automatic door 101.

When a passerby approaches the entrance of the automatic door 101, on the other hand, the ultrasonic waves from the ultrasonic sensor 102 are reflected from that passerby. Detecting the reflected waves, the ultrasonic sensor 102 measures a distance between the reflecting object and itself. In this case, the measured distance disagrees with the teaching distance. Thus, the ultrasonic sensor 102 identifies the reflecting object as something other than the floor face 103, and judges that a passerby is in the vicinity of the entrance of the automatic door 101. The ultrasonic sensor 102 then performs the opening operation of the automatic door 101.

In this conventional automatic door system, the distance between the ultrasonic sensor 102 and the reflecting object is measured by detecting the reflected waves from the reflecting object. The measured distance is then compared with the teaching distance to determine whether to perform the opening operation of the automatic door 101 or not. This system, however, has several shortcomings as follows:

First, when a stationary object such as a wall or a screen other than the floor face 103 is placed in the vicinity of the entrance of the automatic door 101, the ultrasonic waves emitted from the ultrasonic sensor 102 are reflected from the stationary object. This reduces a distance between the ultrasonic sensor 102 and the reflecting object, thereby making the measured distance different from the teaching distance. Accordingly, the automatic door 101 is left open or opened and closed repeatedly.

Second, the ultrasonic sensor 102 detects the reflected waves from a passerby even when the passerby just passes by the entrance of the automatic door 101, and performs the opening operation of the automatic door 101.

SUMMARY OF THE INVENTION

A first aspect of the present invention is directed to an automatic door system comprising: a passable door for a movable passer; and a control portion for detecting a direction that the passer faces with respect to the door and determining whether to allow the passer to pass through the door or not on the basis of the direction.

According to a second aspect of the present invention, in the automatic door system of the first aspect, the passer is movable in a direction at least having either component of first and second axes which are orthogonal to each other; the passer is capable of passing through the door in a direction along the first axis; and the control portion measures a width of the passer along the second axis to detect a direction that the passer faces with respect to the door on the basis of the width.

According to a third aspect of the present invention, in the automatic door system of the first aspect, the passer is movable in a direction at least having either component of first and second axes which are orthogonal to each other; the passer is capable of passing through the door in a direction along the first axis; and the control portion obtains a projection of the passer with respect to a fourth axis to detect a direction that the passer faces with respect to the door on the basis of variance of the projection, the fourth axis having a component of the first axis and a component of a third axis which is orthogonal to both of the first and second axes.

According to a fourth aspect of the present invention, in the automatic door system of the first aspect, the control portion further obtains a plurality of positions of the passer at a plurality of times to detect a moving direction of the passer on the basis of the plurality of positions.

According to a fifth aspect of the present invention, in the automatic door system of the fourth aspect, the control portion further detects a moving speed of the passer on the basis of the plurality of times and the plurality of positions.

A sixth aspect of the present invention is directed to an automatic door system comprising: first and second doors located sequentially; and a control portion for detecting an opening and closing state of the first door and determining whether to allow a passer that is passing through the first door toward the second door, to pass through the second door or not on the basis of the opening and closing state of the first door.

In the automatic door system of the first aspect, as to a passer whose moving direction is predictable from a direction that he faces, the control portion predicts whether the passer is moving to the door or not by detecting the direction that the passer faces with respect to the door. Thus, the control portion opens the door only when the passer that is moving to the door is detected. In other cases, the control portion does not open the door. This suppresses unnecessary operation of the door as compared with a case where the door is opened every time a passer approaches the door.

In the automatic door system of the second aspect, the control portion measures the width of a passer along the second axis, the width being different depending on the direction that the passer faces. This allows the control portion to detect a direction that the passer faces with respect to the door.

In the automatic door system of the third aspect, the control portion obtains variance of a projection of a passer when the passer is viewed from a direction along the fourth axis, the variance of a projection obtained when the passer is viewed obliquely from above being different depending on the direction that the passer faces. This allows the control portion to detect a direction that the passer faces with respect to the door.

In the automatic door system of the fourth aspect, the control portion not only predicts the moving direction of a passer from the direction that the passer faces but also detects the actual moving direction of the passer. Thus, the control portion opens the door only when the passer that is actually moving along the first axial is detected. In other cases, the control portion does not open the door. This further suppresses unnecessary operation of the door.

In the automatic door system of the fifth aspect, the control portion detects the moving speed of a passer when the passer is actually moving along the first axis. This allows the control portion to open the door opportunely depending on the moving speed.

In the automatic door system of the sixth aspect, the operation portion opens the second door after recognizing the closing of the first door which has once been opened for a passer moving to the second door. This prevents the first and the second doors from opening at the same time.

Thus, it is an object of the present invention to provide an automatic door system and a method for controlling an automatic door which prevent the automatic door from being opened when a stationary object is just placed in the vicinity of the entrance of the automatic door or when a passerby just passes by the entrance of the automatic door.

These and other objects, features, aspects and advantages of the present invention will become more apparent from the following detailed description of the present invention when taken in conjunction with the accompanying drawings.

DESCRIPTION OF THE PREFERRED EMBODIMENTS

1. First Preferred Embodiment

Figure 1:
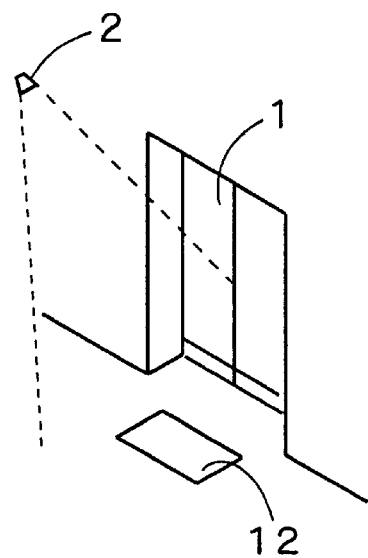
FIG. 1 is a schematic diagram of the vicinity of the entrance of an automatic door.

FIG. 1 is a schematic diagram of the vicinity of the entrance of an automatic door 1. An image pickup device 2 for taking a picture of the vicinity of the entrance of the automatic door 1 is located, for example, on a ceiling or wall (not shown). The image pickup device 2 takes a picture of the vicinity of the entrance from the upper front of the automatic door 1 (i.e., from a direction in which a passerby passes through the door and a vertical direction in which the passerby cannot move). The image pickup device 2 can be an area sensor such as a CCD (Charge Coupled Device) camera, or a CMOS image sensor. Further, a mat 12 is placed in the vicinity of the entrance of the automatic door 1.

Figure 2:
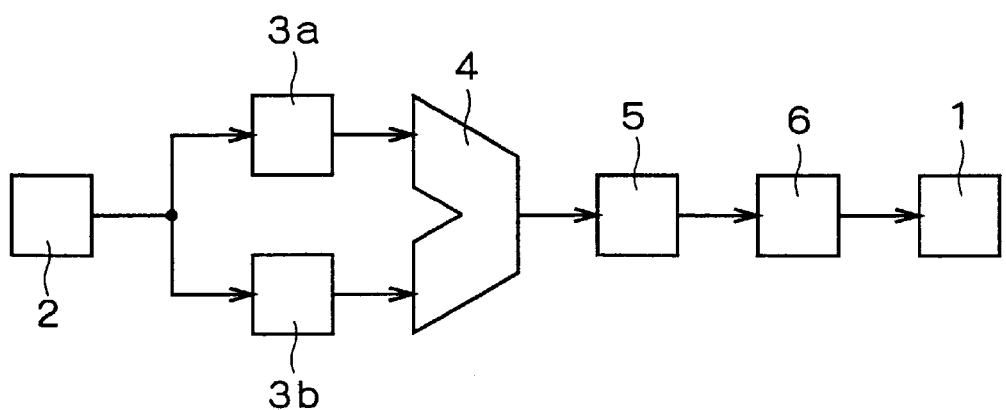
FIG. 2 is a block diagram of the structure of an automatic door system according to a first preferred embodiment of the present invention.

FIG. 2 is a block diagram of the structure of an automatic door system according to a first preferred embodiment of the present invention. An output of the image pickup device 2 is connected to inputs of a first image memory 3a and a second image memory 3b. A subtractor 4 is connected at its one input to an output of the first image memory 3a and at its other input to an output of the second image memory 3b. An output of the subtractor 4 is then connected to an input of a data processing device 5. An output of the data processing device 5 is connected to an input of a control device 6 whose output is connected to an input of the automatic door 1.

Now, we will describe the operation of the system. First, in an initial setting, the image pickup device 2 takes a picture of the vicinity of the entrance of the automatic door 1. A resultant initial image is stored into the first image memory 3a. Here, the "initial setting" indicates a stage before starting the operation of the automatic door 1 at which only a stationary object is placed which will remain throughout the operation of the automatic door 1. To store an image, there is a method for converting the amount of light, with which a plurality of pixels constituting a light receiving face of the image pickup device 2 are irradiated, into 8-bit binary digital data by an A/D converter or the like and storing the digital data on a pixel basis. For example, digital data "00000000" is assigned to the maximum amount of light, "white", and digital data "11111111" to the minimum amount of light, "black". It is, however, desirable to assign "00000000" to the "white" and "01111111" to the "black" in two's complement notation, in consideration of a probability that a negative value will be calculated by the subtractor 4. These kinds of digital data are binary number in two's complement notation. The following description is given on the premise that any digital data is written in two's complement notation.

Figure 3:
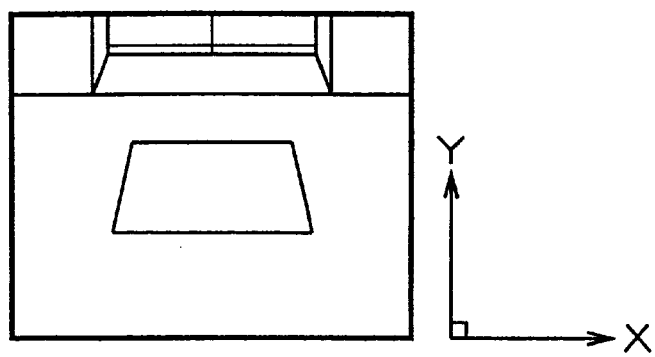
FIG. 3 shows an initial image stored in a first image memory.

FIG. 3 shows the initial image stored in the first image memory 3a. As previously described, the initial image is taken before starting the operation of the automatic door 1. Thus, in the initial image, the automatic door 1 is close and no passerby is in the vicinity of the entrance of the automatic door 1 as shown in FIG. 3.

Then, the operation of the automatic door 1 starts. During operation, the image pickup device 2 keeps taking a picture of the vicinity of the entrance of the automatic door 1. In the specification, an image taken by the image pickup device 2 during the operation of the automatic door 1 is referred to as a "detected image" to distinguish it from the initial image. The detected image is stored into the second image memory 3b in the same way as the initial image.

Figure 4:
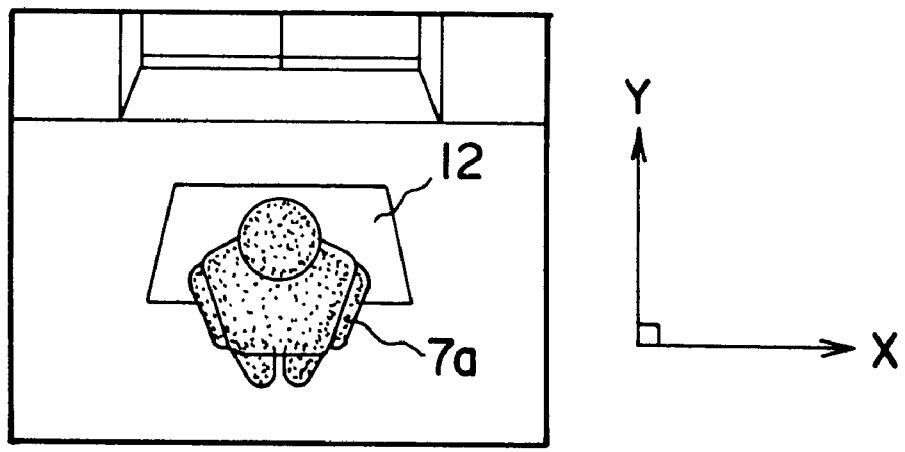
FIG. 4 shows an example of a detected image.
Figure 5:
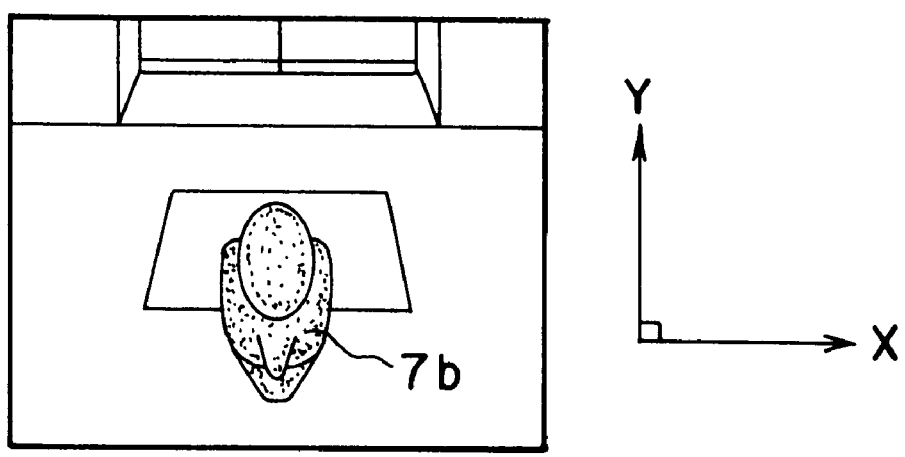
FIG. 5 shows another example of the detected image.

FIGS. 4 and 5 show examples of the detected image. In a detected image shown in FIG. 4, there appears a passerby 7a facing toward the automatic door 1. In a detected image shown in FIG. 5, there appears a passerby 7b facing sideways. In general, a passerby who is passing through the automatic door faces toward the door. Thus, it can be judged that the passerby 7a in the detected image in FIG. 4 is passing through the automatic door 1. On the other hand, a passerby who is passing by the automatic door generally faces sideways. Thus, it can be judged that the passerby 7b in the detected image in FIG. 5 is just passing by the automatic door 1. Further, when no passerby is in the vicinity of the entrance of the automatic door 1, a detected image to be obtained becomes identical with the initial image in FIG. 3.

Digital data of the initial image stored in the first image memory 3a and digital data of the detected image stored in the second image memory 3b are both entered into the subtractor 4. The subtractor 4 performs subtraction of the digital data of the initial image from the digital data of the detected image. Then, resultant digital data by the subtraction is entered into the data processing device 5.

Figure 6:
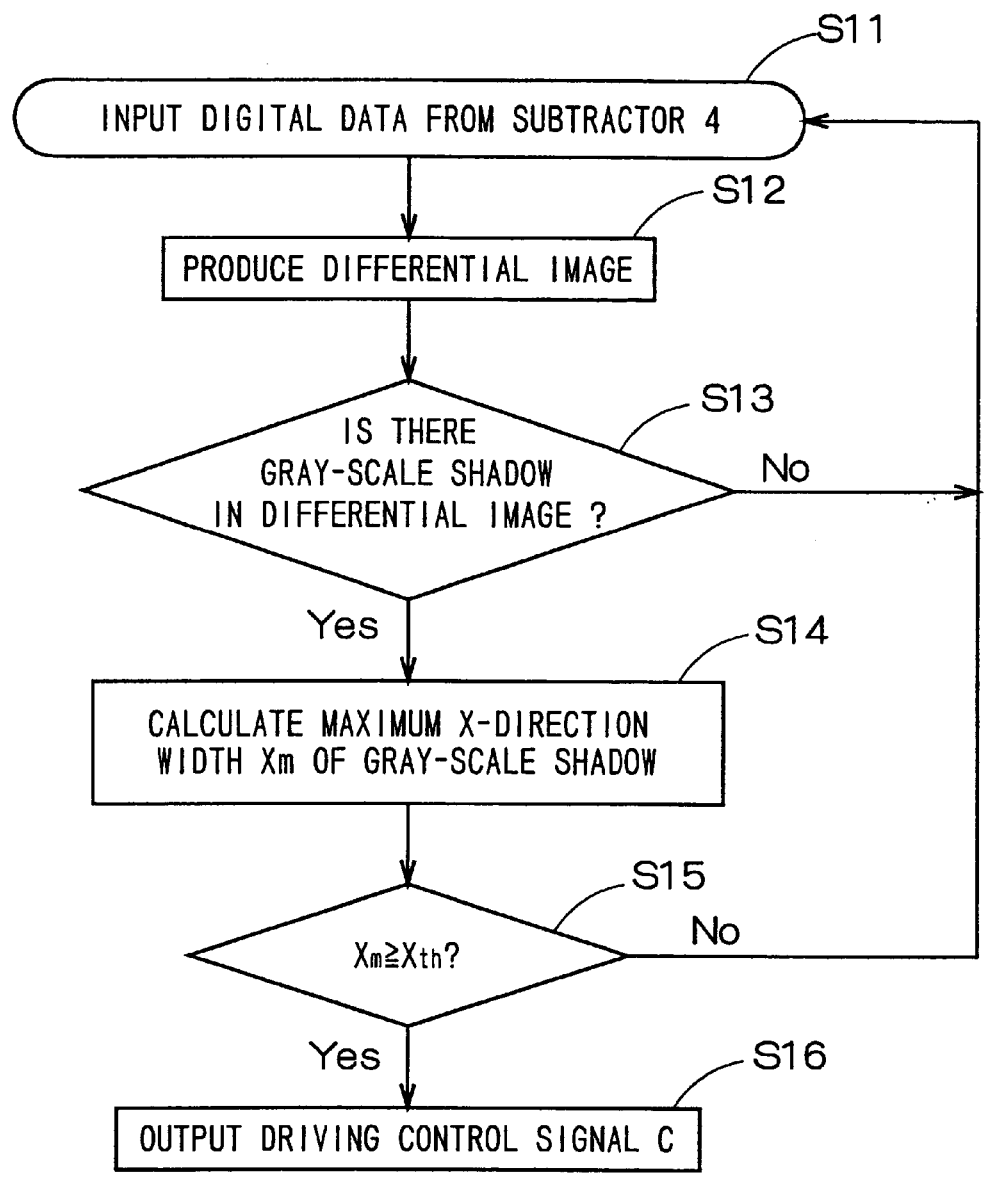
FIG. 6 is a flow chart of the operation of a data processing device.

FIG. 6 is a flow chart of the operation of the data processing device 5. Referring to the drawing, we will give a concrete description of the operation. First, the data processing device 5 inputs digital data from the subtractor 4 (step S11). On the basis of the entered digital data, the data processing device 5 produces a differential image by subtracting the initial image from the detected image (step S12).

Figure 7:
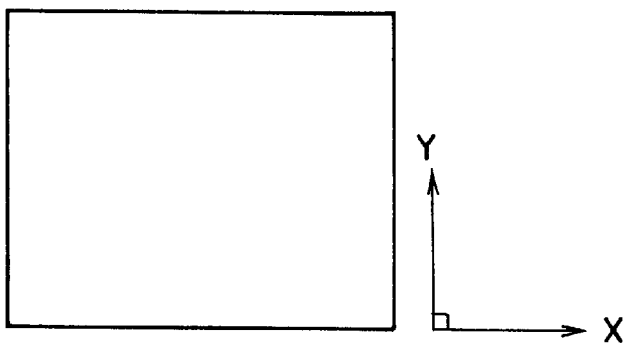
FIG. 7 shows a differential image obtained by subtracting the initial image from the detected image when no passerby is in the vicinity of the entrance of the automatic door.

FIG. 7 shows a differential image obtained by subtracting the initial image in FIG. 3 from a detected image obtained when no passerby is in the vicinity of the entrance of the automatic door 1 (identical with the initial image in FIG. 3). In this case, digital data of each pixel in the detected image is completely identical with that in the initial data. That is, all the digital data obtained through the subtraction by the subtractor 4 is "00000000".

Consequently, the differential image produced by the data processing device 5 becomes completely white as shown in FIG. 7.

Figure 8:
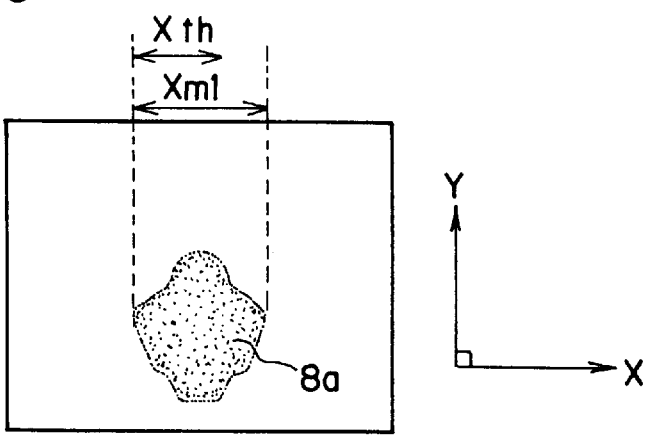
FIG. 8 shows a differential image obtained by subtracting the initial image from the detected image in FIG. 4.

FIG. 8 shows a differential image obtained by subtracting the initial image in FIG. 3 from the detected image in FIG. 4. Compared with the initial image in FIG. 3, there appears a new object, a passerby 7a, in the detected image in FIG. 4. Thus, when the subtractor 4 subtracts the digital data of the initial image from the digital data of the detected image in FIG. 4, resultant digital data in a portion where the passerby 7a appears is other than "00000000" while resultant digital data in the other portion is "00000000". Accordingly, the passerby 7a appears as a gray-scale shadow in the differential image as shown in FIG. 8. Here, the "gray scale" indicates digital data other than "00000000" and "01111111" when the "white" is "00000000" and the "black" is "01111111" as previously described. Further, in the detected image in FIG. 4, the mat 12 placed in the vicinity of the entrance of the automatic door 1 and an upper body of the passerby 7a are somewhat overlapped. Strictly speaking, digital data of the upper body in the gray-scale shadow 8a is different from that of the lower body because of digital data of pixels where the mat 12 is placed. However, as long as the digital data of the mat 12 somewhat disagrees with the digital data of the passerby 7a, the upper body of the passerby 7a appears as a part of the gray-scale shadow 8a in the differential image.

Figure 9:
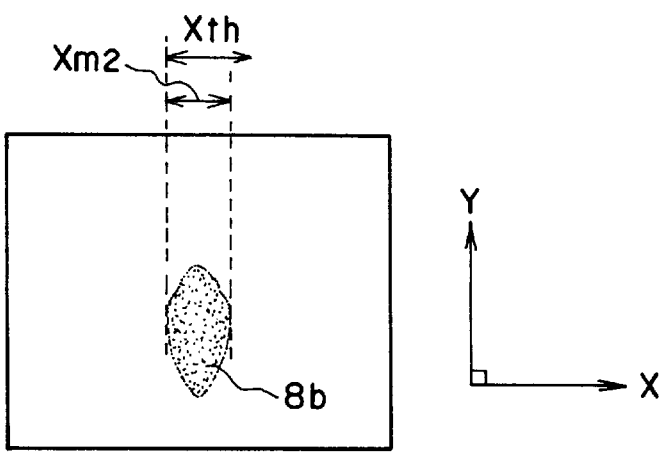
FIG. 9 shows a differential image obtained by subtracting the initial image from the detected image in FIG. 5.

FIG. 9 shows a differential image obtained by subtracting the initial image in FIG. 3 from the detected image in FIG. 5. For the same reason that the passerby 7a appears as the gray-scale shadow 8a in the differential image in FIG. 8, the passerby 7b appears as a gray-scale shadow 8b in the differential image in FIG. 9.

Next, the data processing device 5 judges whether a gray-scale shadow is in the produced differential image or not (step S13). This can be judged, for example, according to whether all digital data of pixels in the differential image is "00000000" or not. When a gray-scale shadow appears in the differential image (e.g. FIGS. 8 and 9), the data processing device 5 judges the presence of the passerby 7a or 7b in the vicinity of the entrance of the automatic door 1. On the other hand, when no gray-scale shadow appears (e.g. FIG. 7), the data processing device 5 judges the absence of the passerby 7a or 7b in the vicinity of the entrance of the automatic door 1.

When no gray-scale shadow appears in the differential image, the process returns to the step S11, at which the data processing device 5 inputs the next digital data from the subtractor 4. When a gray-scale shadow appears in the differential image, on the other hand, the process proceeds to a step S14, at which the data processing device 5 calculates the maximum width $X_m$ of the gray-scale shadow in an X direction. Here, the "X" direction indicates a direction orthogonal to a direction in which a passerby passes through the door in the image. Consequently, $X_{m1}$ is the maximum X-direction width of the gray-scale shadow 8a in the differential image in FIG. 8, and $X_{m2}$ is the maximum X-direction width of the gray-scale shadow 8b in the differential image in FIG. 9.

Then, the data processing device 5 compares the calculated maximum width $X_m$ with a predetermined threshold value $X_{th}$ (step S15). In general, a width of human shoulders is larger than a thickness of his body. With this fact in mind, the threshold value $X_{th}$ is set smaller than the average value of X-direction widths of gray-scale shadows obtained when the image pickup device 2 takes a picture of a passerby facing toward the automatic door 1, and larger than the average value of X-direction widths of gray-scale shadows obtained when the image pickup device 2 takes a picture of a passerby facing sideways (i.e., facing in the X direction).

As a result, when the calculated maximum width $X_m$ is less than the threshold value $X_{th}$ (e.g. $X_2 < X_{th}$ in FIG. 9), the data processing device 5 judges that the passerby faces sideways with respect to the automatic door 1, and returning to the step S11, inputs the next digital data from the subtractor 4. On the other hand, when the calculated maximum width $X_m$ is equal to the threshold value $X_{th}$ or more (e.g. $X_1 > X_{th}$ in FIG. 8), the data processing device 5 judges that the passerby faces toward the automatic door 1, and processing to a step S16, outputs a driving control signal C for opening the automatic door 1.

The driving control signal C outputted from the data processing device 5 is entered into a control device 6. On receipt of the driving control signal C, the control device 6 drives and opens the automatic door 1.

In the automatic door system according to the first preferred embodiment of the present invention, the data processing device judges whether a passerby faces toward the automatic door or faces sideways by comparing the maximum X-direction width of the gray-scale shadow in the differential image with a predetermined threshold value. That is, the data processing device judges whether a passerby is to pass through or just to pass by the automatic door. When the maximum X-direction width of the gray-scale shadow is less than the threshold value, the data processing device judges that the passerby faces sideways with respect to the automatic door and thus does not output the driving control signal for opening the automatic door. This allows the system to prevent the automatic door from being opened when a passerby just passes by the automatic door.

Further, even when the stationary object placed in the vicinity of the entrance of the automatic door is moved, the image pickup device can take a picture of the vicinity of the entrance after this movement to update the initial image stored in the first image memory. This prevents misoperation of the automatic door.

The Japanese Patent Laid-Open No. 4-111079A discloses a movable-body identifying device for identifying a movable body on the basis of a differential image obtained by subtracting a background image from the present image. The automatic door system of the first preferred embodiment, however, has an additional function to detect a direction that a passerby faces. This allows the system to open the automatic door only when a passerby faces toward the automatic door. In this respect, this preferred embodiment is more advantageous than the prior art.

2. Second Preferred Embodiment

In the aforementioned first preferred embodiment, the data processing device judges whether a passerby faces toward the automatic door or faces sideways by comparing the maximum X-direction width of the gray-scale shadow in the differential image with a predetermined threshold value. In this second preferred embodiment, when a passerby is in the vicinity of the entrance of the automatic door, the data processing device employs another method to judge whether the passerby faces toward the automatic door or faces sideways.

The structure of an automatic door system according to the second preferred embodiment is similar to that of the first preferred embodiment shown in FIG. 2.

Now, we will describe the operation of the system. The processes until the subtractor 4 outputs digital data from its calculation result are similar to those of the first preferred embodiment.

Figure 10:
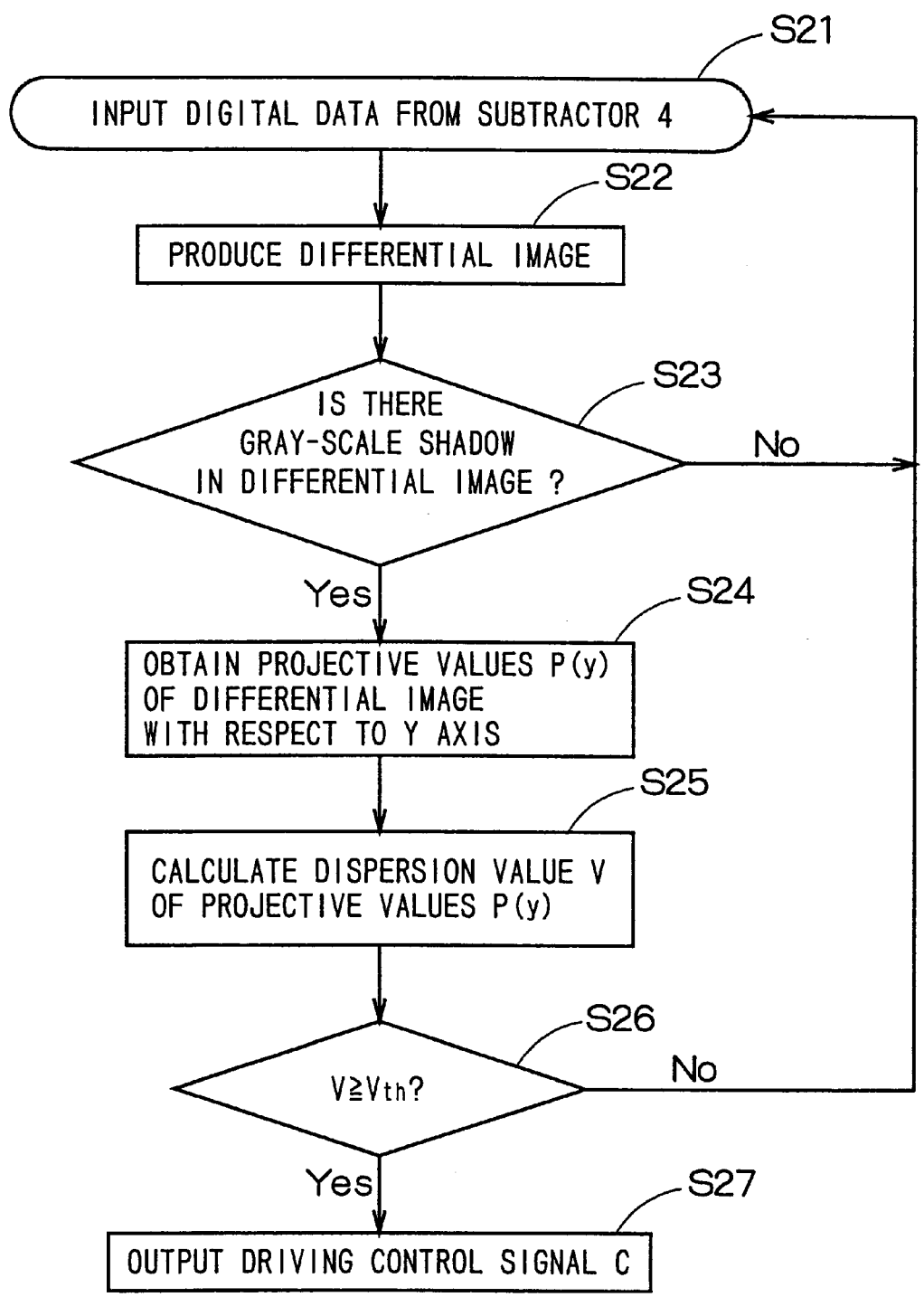
FIG. 10 is a flow chart of the operation of a data processing device according to a second preferred embodiment of the present invention.

FIG. 10 is a flow chart of the operation of the data processing device 5 according to the second preferred embodiment. Referring to the drawing, we will give a concrete description of the operation.

First, the data processing device 5 inputs digital data from the subtractor 4 (step S21) and produces a differential image by subtracting the initial image from the detected image on the basis of the entered digital data (step S22). When no passerby is in the vicinity of the entrance of the automatic door 1, a differential image shown in FIG. 7 is obtained. When a passerby facing toward the automatic door 1 is in the vicinity of the entrance of the door 1, a differential image shown in FIG. 8 is obtained. When a passerby facing sideways is in the vicinity the entrance of the door 1, a differential image shown in FIG. 9 is obtained.

Next, the data processing device 5 judges whether a gray-scale shadow is in the produced differential image or not (step S23). This can be judged, for example, according to whether all digital data of pixels in the differential image is "00000000" or not.

Figure 11:
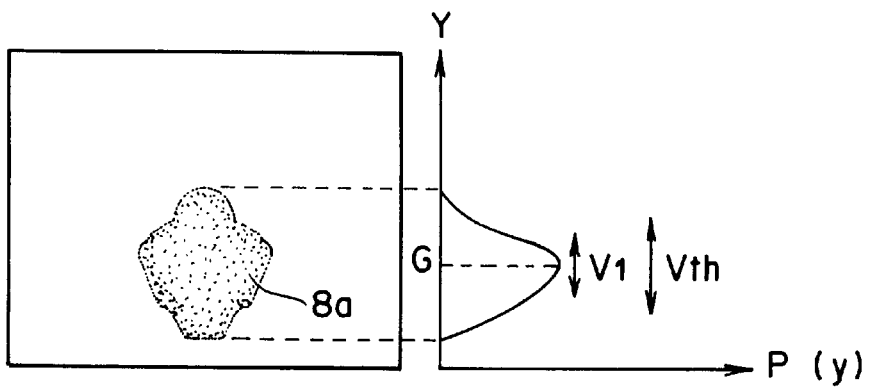
FIG. 11 shows a projective result of the differential image in FIG. 8.
Figure 12:
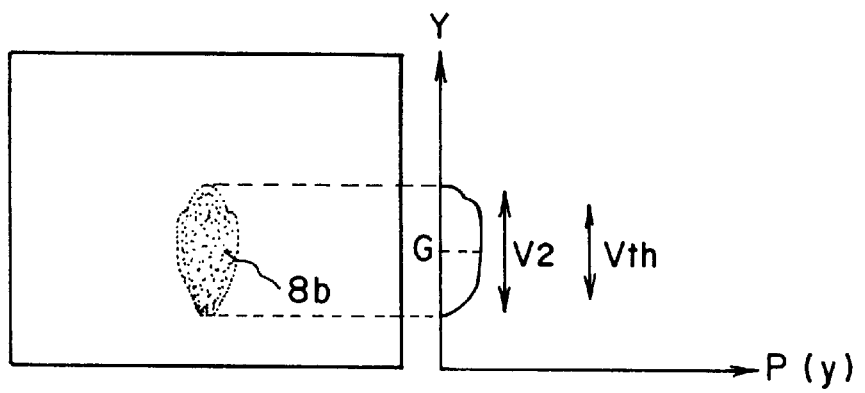
FIG. 12 shows a projective result of the differential image in FIG. 9.

When no gray-scale shadow appears in the differential image (e.g. FIG. 7), the process returns to the step S21, at which the data processing device 5 inputs the next digital data from the subtractor 4. When a gray-scale shadow appears in the differential image (FIGS. 8 and 9), on the other hand, the process proceeds to a step S24, at which the data processing device 5 projects the differential image with respect to the Y axis to obtain projective values P(y) at positions y on the Y axis. Here, the "Y axis" extends perpendicular to the X axis of the differential image, along a direction having a component of a direction in which a passerby passes through the door and a component of a vertical direction. Further, "projecting an image with respect to the Y axis" indicates adding (accumulating) digital data of pixels for each of the positions y on the Y axis. FIG. 11 shows a projective result of the differential image in FIG. 8, and FIG. 12 shows a projective result of the differential image in FIG. 9. It can be seen that positions with the gray-scale shadows 8a and 8b have larger projective values P(y) than the other positions.

Next, the data processing device 5 calculates a variance value V of the projective values P(y) obtained at the step S24 (step S25). The variance value V is found by:

$$V = \Sigma((P(y) - G)^2) \tag{1}$$

where $\Sigma$ is the total for the positions y, and $G = (\Sigma y \cdot P(y))/(\Sigma P(y))$. Consequently, $V_1$ is a variance value of the projective values P(y) shown in FIG. 11, and $V_2$ is a variance value of the projective values P(y) shown in FIG. 12.

Then, the data processing device 5 compares the calculated variance value V with a predetermined threshold value $V_{th}$ (step S26). Here, consider a case where an upright person is observed obliquely from above. When a person to be observed faces toward an observer, the person looks almost like an inverted triangle because his shoulders and arms are emphasized. Thus, when that person is projected with respect to an assumed vertical axis of the plane of visibility of the observer (which is obtained by showing the actual vertical axis on the plane of visibility), a small variance value is obtained. On the other hand, when a person to be observed faces sideways with respect to the observer, the person looks almost like an ellipse because his shoulders and arms overlap with his body. Thus, when that person is projected with respect to the assumed vertical axis, a larger variance value is obtained. With this fact in mind, the threshold value $V_{th}$ is set smaller than the average value of variance values based on the projection of differential images obtained when the image pickup device 2 takes a picture of a passerby facing toward the automatic door 1, and larger than the average value of variance values based on the projection of differential images obtained when the image pickup device 2 takes a picture of a passerby facing sideways with respect to the automatic door 1.

As a result, when the calculated variance value V is less than the threshold value $V_{th}$ (e.g. $V_2<V_{th}$ in FIG. 12), the data processing device 5 judges that the passerby faces sideways with respect to the automatic door 1, and returning to the step S21, inputs the next digital data from the subtractor 4. On the other hand, when the calculated variance value V is equal to the threshold value $V_{th}$ or more (e.g. $V_1>V_{th}$ in FIG. 11), the data processing device 5 judges that the passerby faces toward the automatic door 1 and, proceeding to a step S27, outputs the driving control signal C for opening the automatic door 1.

The driving control signal C outputted from the data processing device 5 is entered into the control device 6. On receipt of the driving control signal C, the control portion 6 drives and opens the automatic door 1 as in the first preferred embodiment.

Figure 13:
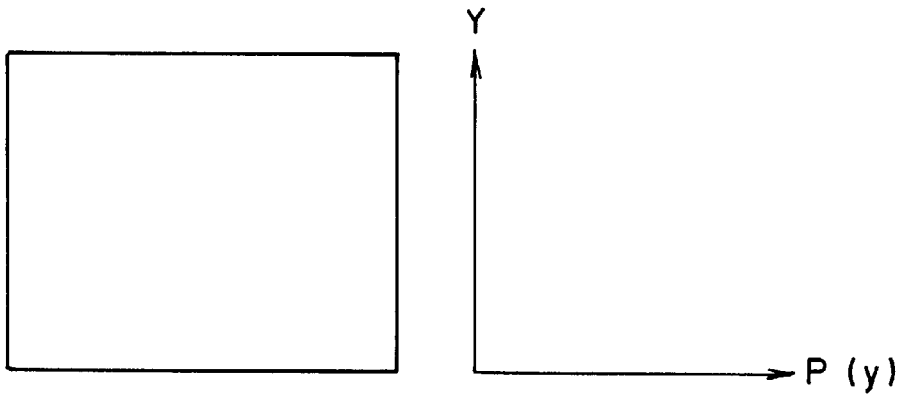
FIG. 13 shows a projective result of a differential image when no passerby is in the vicinity of the entrance of the automatic door.

In the forgoing description, after a differential image is produced, whether a gray-scale shadow appears in the differential image or not is judged at the step S23 to obtain the projective value P(y) only when a gray-scale shadow appears in the differential image. Alternatively, the projective value P(y) can be obtained for every differential image, omitting the step S23. In this case, when no gray-scale shadow appears in a differential image, all projective values P(y) of the positions y become zero as shown in FIG. 13. Consequently, $V<V_{th}$ so that the data processing device 5 does not output the driving control signal C.

In the automatic door system according to the second preferred embodiment of the present invention, the data processing device judges whether a passerby faces toward the automatic door 1 or faces sideways by obtaining the projective values by projection of a differential image, calculating a variance value of the projective values, and comparing the variance value with a predetermined threshold value. That is, the data processing device judges whether a passerby is to pass through or just to pass by the automatic door. When the calculated variance value is less than the predetermined threshold value, the data processing device judges that the passerby faces sideways with respect to the automatic door and thus does not output the diving control signal for opening the automatic door. This allows the system to prevent the automatic door from being opened when a passerby just passes by the automatic door.

3. Third Preferred Embodiment

A third preferred embodiment of the present invention provides a further improved automatic door system. In this system, the data processing device 5 of the first or second preferred embodiment has an additional function to detect walking direction and speed of a passerby.

The structure of the automatic door system of the third preferred embodiment is similar to that of the first preferred embodiment shown in FIG. 2.

Now, we will describe the operation of the system. First, in the initial setting before starting the operation of the automatic door 1, the image pickup device 2 takes a picture of the vicinity of the entrance of the automatic door 1 as in the first preferred embodiment. A resultant initial image, identical with that shown in FIG. 3, is stored into the first image memory 3a, and digital data thereof is entered into the subtractor 4.

Figure 14:
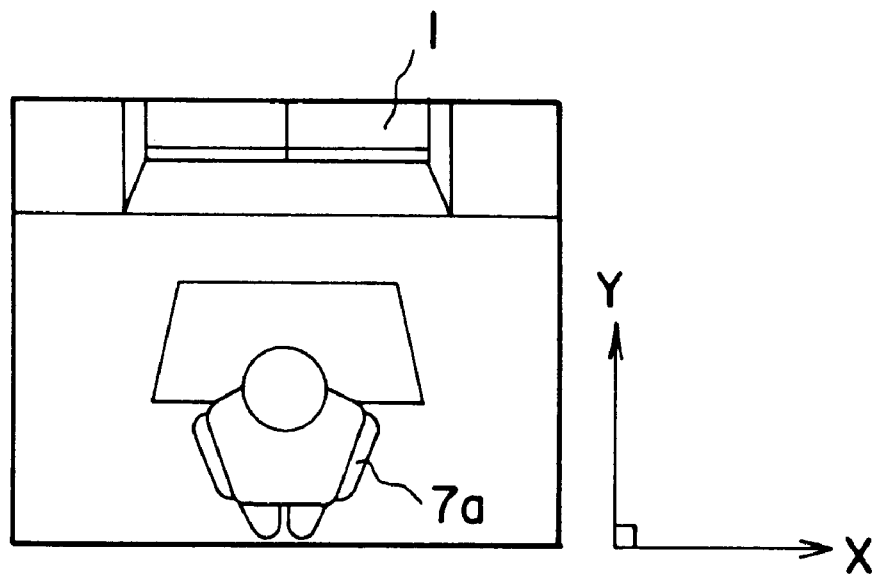
FIG. 14 shows an example of the detected image.

Next, during operation of the automatic door 1, the image pickup device 2 takes a picture of the vicinity of the entrance of the automatic door 1 to obtain a detected image. FIG. 14 shows an example of the detected image in which a passerby 7a facing toward the automatic door 1 appears. In the specification, the detected image in FIG. 14 is referred to as a "first detected image". The first detected image is stored into the second image memory 3b, and digital data thereof is entered into the subtractor 4.

The subtractor 4 then subtracts the digital data of the initial image from the digital data of the first detected image as in the first preferred embodiment. Resultant digital data by the subtraction is entered into the data processing device 5.

Figure 15:
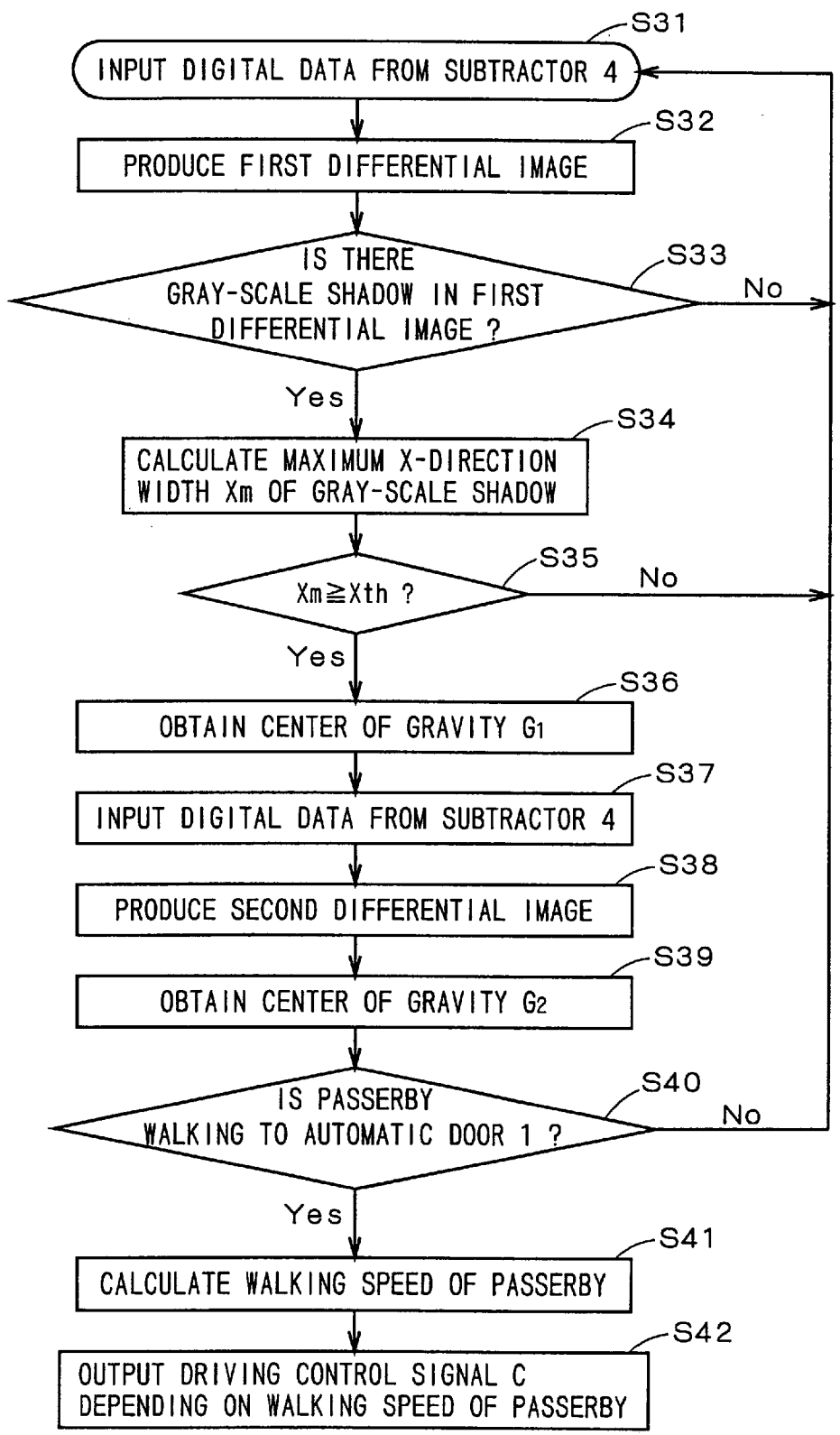
FIG. 15 is a flow chart of the operation of a data processing device according to a third preferred embodiment of the present invention.

FIG. 15 is a flow chart of the operation of the data processing device 5 according to the third preferred embodiment. Referring to the drawing, we will give a concrete description of the operation. First, through similar steps to those of the first preferred embodiment, the data processing device 5 judges the presence or absence of a passerby facing toward the automatic door 1. That is, the data processing device 5 inputs digital data from the subtractor 4 (step S31) and produces a differential image on the basis of the entered digital data (step S32). The differential image produced at the step S32 is based on the first detected image, so it referred to as a "first differential image". The data processing device 5 then judges whether a gray-scale shadow is in the first differential image or not (step S33). When no gray-scale shadow appears in the first differential image, the process returns to the step S31, at which the data processing device 5 inputs the next digital data from the subtractor 4. When a gray-scale shadow appears in the first differential image, on the other hand, the process proceeds to a step S34, at which the data processing device 5 calculates the maximum X-direction width $X_m$ of the gray-scale shadow. The calculated maximum value $X_m$ is then compared with a predetermined threshold value $X_{th}$ (step S35). In this fashion, the data processing device 5 judges whether the passerby faces toward the automatic door 1 or not. Of course, this judgement can be made on the basis of the variance of projection as in the second preferred embodiment.

Figure 16:
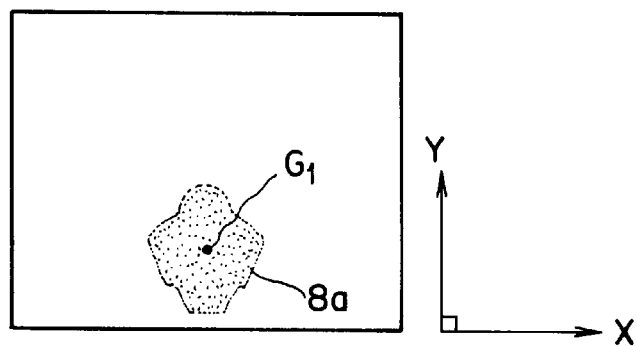
FIG. 16 shows a differential image obtained by subtracting the initial image from a first detected image, together with the center of gravity $G_1$.

When the calculated maximum value $X_m$ is less than the threshold value $X_{th}$, the process returns to the step S31, at which the data processing device 5 inputs the next digital data from the subtractor 4. When the calculated maximum value $X_m$ is equal to the threshold value $X_{th}$ or more, on the other hand, the process proceeds to a step S36, at which the data processing device 5 detects a walking direction of the passerby. First, the data processing device 5 calculates coordinates $(X_G, Y_G)$ of the center of gravity $G_1$ of the first differential image (step S36). The coordinates $(X_G, Y_G)$ of the center of gravity $G_1$ is found by:

$$G_1 = (X_G, Y_G) = (\Sigma x_i \cdot p_{ij}, \Sigma y_i \cdot p_{ij}) \qquad (2)$$

where $(x_i, y_i)$ is the coordinates of each pixel constituting a light receiving face of the image pickup device 2, and $p_{ij}$ is the digital data of a pixel at the coordinates $(x_i, y_i)$. FIG. 16 shows the first differential image obtained by subtracting the initial image in FIG. 3 from the first detected image in FIG. 14, together with the center of gravity $G_1$. Since the differential image is an image removing all backgrounds other than a passerby, a position of the center of gravity $G_1$ of the first differential image agrees closely with that of a center of gravity of a gray-scale shadow 8a, namely that of a center of gravity of the passerby 7a in the first detected image, as shown in FIG. 16.

Figure 17:
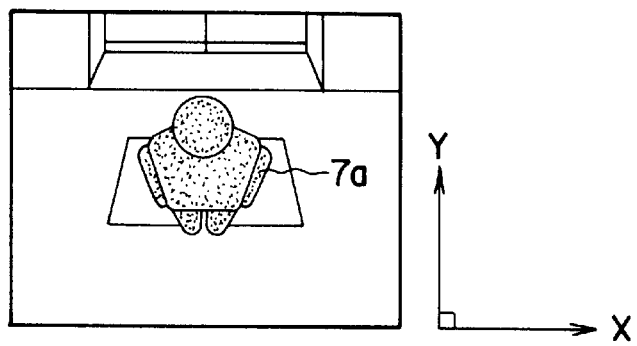
FIG. 17 shows a detected image taken by an image pickup device after a predetermined period of time has passed since the first detected image is taken.

During operation of the automatic door 1, the image pickup device 2 keeps taking a picture of the vicinity of the entrance of the automatic door 1. FIG. 17 shows a detected image taken by the image pickup device 2 after a predetermined period of time Δt has passed since the first detected image is taken. Compared with the first detected image in FIG. 14, it can be seen that the passerby 7a is closer to the automatic door 1 in the detected image in FIG. 17. In the specification, the detected image in FIG. 17 is referred to as a "second detected image". The second detected image is stored into the second image memory 3b and digital data thereof is entered into the subtractor 4. The subtractor 4 subtracts the digital data of the initial image from the digital data of the second detected image. Resultant digital data by the subtraction is then entered into the data processing device 5 (step S37).

Figure 18:
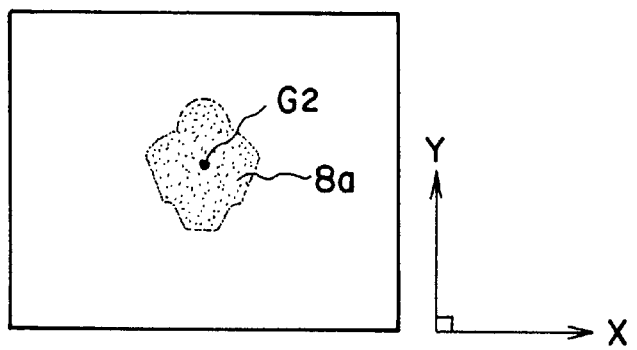
FIG. 18 shows a differential image obtained by subtracting the initial image from a second detected image, together with the center of gravity $G_2$.

Next, the data processing device 5 produces a differential image on the basis of the entered digital data (step S38). The differential image produced at the step S38 is based on the second detected image, so it is referred to as a "second differential image". The data processing device 5 then obtains the center of gravity $G_2$ of the second differential image in the same way as the center of gravity $G_1$ (step S39). FIG. 18 shows the second differential image obtained by subtracting the initial image in FIG. 3 from the second detected image in FIG. 17, together with the center of gravity $G_2$. Like the first differential image in FIG. 16, a position of the center of gravity G2 of the second differential image agrees closely with that of the center of gravity of a gray-scale shadow 8a, namely, that of the center of gravity of the passerby 7a in the second detected image.

The data processing device 5 then compares the coordinates of the center of gravity $G_1$ in FIG. 16 and the coordinates of the center of gravity $G_2$ in FIG. 18 to detect a direction in which the center of gravity of the differential image moves during the predetermined period of time Δt (step S40). When the moving direction of the center of gravity agrees closely with the direction Y, the data processing device 5 judges that the passerby 7a is to pass through the automatic door 1. On the other hand, when the moving direction of the center of gravity is completely different from the direction Y, the data processing device 5 judges that the passerby 7a is just to pass by the automatic door 1 and, returning to the step S31, inputs the next digital data from the subtractor 4.

When the passerby 7a who is passing through the automatic door 1 is detected, the data processing device 5 calculates a walking speed of the passerby 7a (step S41). The walking speed can be obtained by calculating the amount of movement of the center of gravity of the differential image from the coordinates of the centers of gravity $G_1$ and $G_2$, and dividing the amount of movement by the elapsed time Δt.

The data processing device 5 then calculates a time when the passerby 7a arrives in front of the automatic door 1, from his walking speed, and at the arrival time, outputs the driving control signal C for opening the automatic door 1 (step S42).

The driving control signal C is entered into the control device 6. On receipt of the driving control signal C, the control device 6 drives and opens the automatic door 1.

In the foregoing description, the walking direction and speed of a passerby are detected with reference to the centers of gravity $G_1$ and $G_2$ of the differential image. Alternatively, they can be calculated on the basis of a distribution of moving vectors of the pixels between images, as in obtaining an optical flow used for dynamic-image analysis.

In the automatic door system according to the third preferred embodiment, when a passerby is to pass through the automatic door, the data processing device opens the automatic door opportunely with consideration for his walking speed. Thus, the passerby can pass through the automatic door smoothly without pausing in front of the door.

4. Fourth Preferred Embodiment

Figure 19:
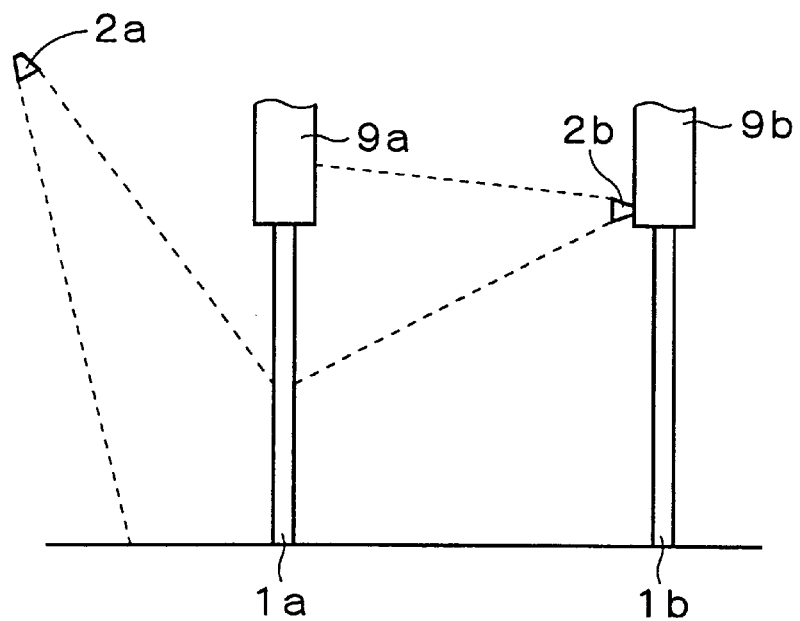
FIG. 19 is a side view schematically showing the structure of dual doors.

A fourth preferred embodiment of the present invention relates to dual door drive control for two automatic doors located sequentially. FIG. 19 is a side view schematically showing the structure of dual doors. The dual doors consists of a first automatic door 1a and a second automatic door 1b located sequentially. We will now give a description, assuming that a passerby walking from the left of the first automatic door 1a will walk to the right, passing through the first and the second automatic doors 1a and 1b sequentially. A first image pickup device 2a is an image sensor for taking a picture of the vicinity of an entry side of the first automatic door 1a. A second image pickup device 2b is an image sensor for taking a picture of the vicinity of an exit side of the first automatic door 1a, located for example on an upper wall 9b above the second automatic door 1b.

The first automatic door 1a and the first image pickup device 2a shown in FIG. 19 correspond to the automatic door 1 and the image pickup device 2 in FIG. 1, respectively. Thus, the driving control of the first automatic door 1a is performed in the same way as described in the first to third preferred embodiments. This fourth preferred embodiment focuses on drive control of the second automatic door 1b.

Figure 20:
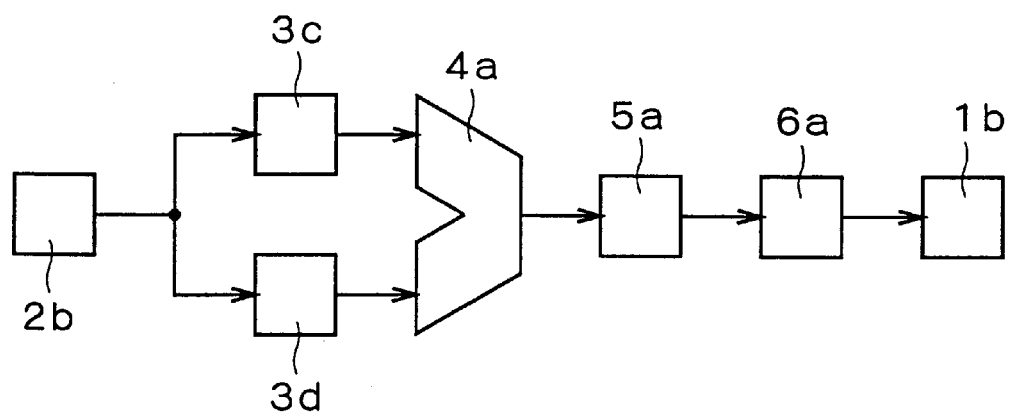
FIG. 20 is a block diagram of the structure of an automatic door system according to a fourth preferred embodiment of the present invention.

FIG. 20 is a block diagram of the structure of an automatic door system according to the fourth preferred embodiment of the present invention. An output of the second image pickup device 2b is connected to inputs of a first image memory 3c and a second image memory 3d. A subtractor 4a is connected at its one input to an output of the first image memory 3c and at its other input to an output of the second image memory 3d. An output of the subtractor 4a is then connected to an input of a data processing device 5a. An output of the data processing device 5a is connected to an input of a control device 6a whose output is connected to an input of the second automatic door 1b.

Now, we will describe the operation of the system. First, in an initial setting, the second image pickup device 2b takes a picture of the vicinity of the exit side of the first automatic door 1a. A resultant initial image is stored into the first image memory 3c. Here, the "initial setting" indicates a stage before starting the operation of the dual doors at which only a stationary object is placed which will remain throughout the operation.

Figure 21:
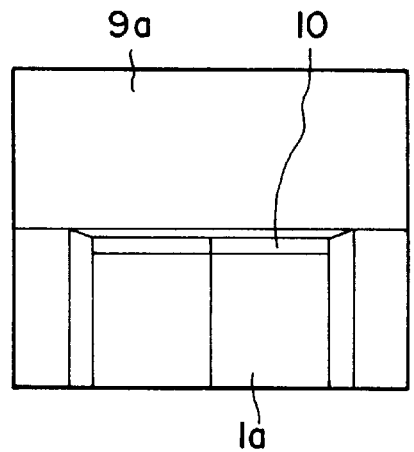
FIG. 21 shows an initial image stored in a first image memory.

FIG. 21 shows the initial image stored in the first image memory 3c. As previously described, the initial image is taken before starting the operation of the dual doors. Thus, in the initial image, the first automatic door 1a is close and no passerby is in the vicinity of the exit side thereof as shown in FIG. 21. In this image, there appears a wheel storage portion 10 for storing a wheel (not shown) provided in an upper end portion of the first automatic door 1a.

Next, the operation of the dual doors starts. During operation, the second image pickup device 2b keeps taking a picture of the vicinity of the exit side of the first automatic door 1a. A detected image taken by the second image pickup device 2b is stored into the second image memory 3d.

Figure 22:
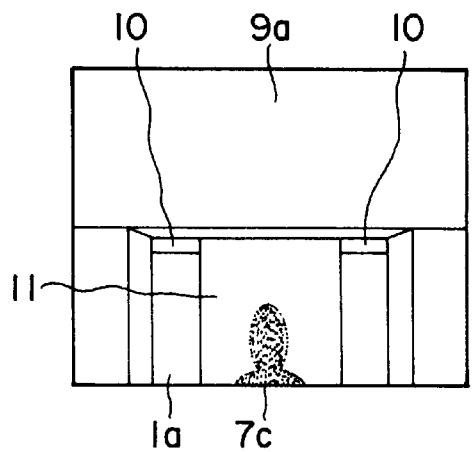
FIG. 22 shows an example of a detected image taken by a second image pickup device.
Figure 23:
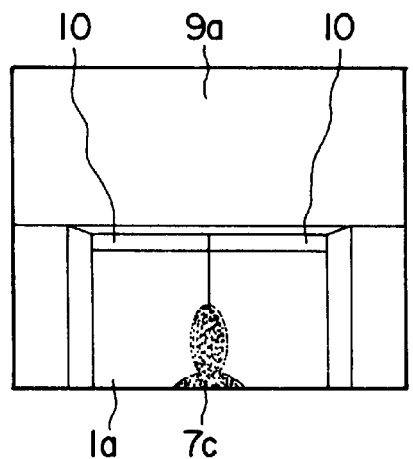
FIG. 23 shows another example of the detected image taken by the second image pickup device.

FIGS. 22 and 23 show examples of the detected image taken by the second image pickup device 2b. In both detected images in FIGS. 22 and 23, a passerby 7c appears. In the detected image in FIG. 22, the passerby 7c is on the way to pass through the first automatic door 1a and the first automatic door 1a is still open. In the detected image in FIG. 23, on the other hand, the passerby 7c has already passed through the first automatic door 1a and the first automatic door 1a is close. When no passerby is passing through the dual doors, a detected image to be taken by the second image pickup device 2b becomes identical with the initial image in FIG. 21.

In the detected image in FIG. 22, digital data of the wheel storage portion 10 is larger than that of a background 11 that appears at the opening of the first automatic door 1a. This is because, since the second image pickup device 2b focuses on the first automatic door 1a, the wheel storage portion 10 is properly focused but the background 11 is out of focus. However, considering a possibility that the digital data of the background 11 may be increased to some extent, the wheel storage portion 10 can be painted in a color, for example, corresponding to the maximum digital data "01111111" (in this case black).

Further, in both of the detected images in FIGS. 22 and 23, the digital data of the passerby 7c is required to be larger than that of the first automatic door 1a. In FIGS. 22 and 23, a face portion of the passerby 7c appears in the detected images. Thus, the colors of hair and skin make the digital data of the passerby 7c somewhat large. Accordingly, the aforementioned requirement that the digital data of the passerby 7c be larger than that of the first automatic door 1a can be satisfied by painting the first automatic door 1a in a color corresponding to a digital data smaller than that of the hair and skin colors of the passer 7c, for example, the minimum digital data "00000000" (in this case white).

The digital data of the initial image stored in the first image memory 3c and the digital data of the detected image stored in the second image memory 3d are both entered into the subtractor 4a. The subtractor 4a subtracts the digital data of the initial image from the digital data of the detected image. Resultant digital data by the subtraction is then entered into the data processing device 5a.

Figure 24:
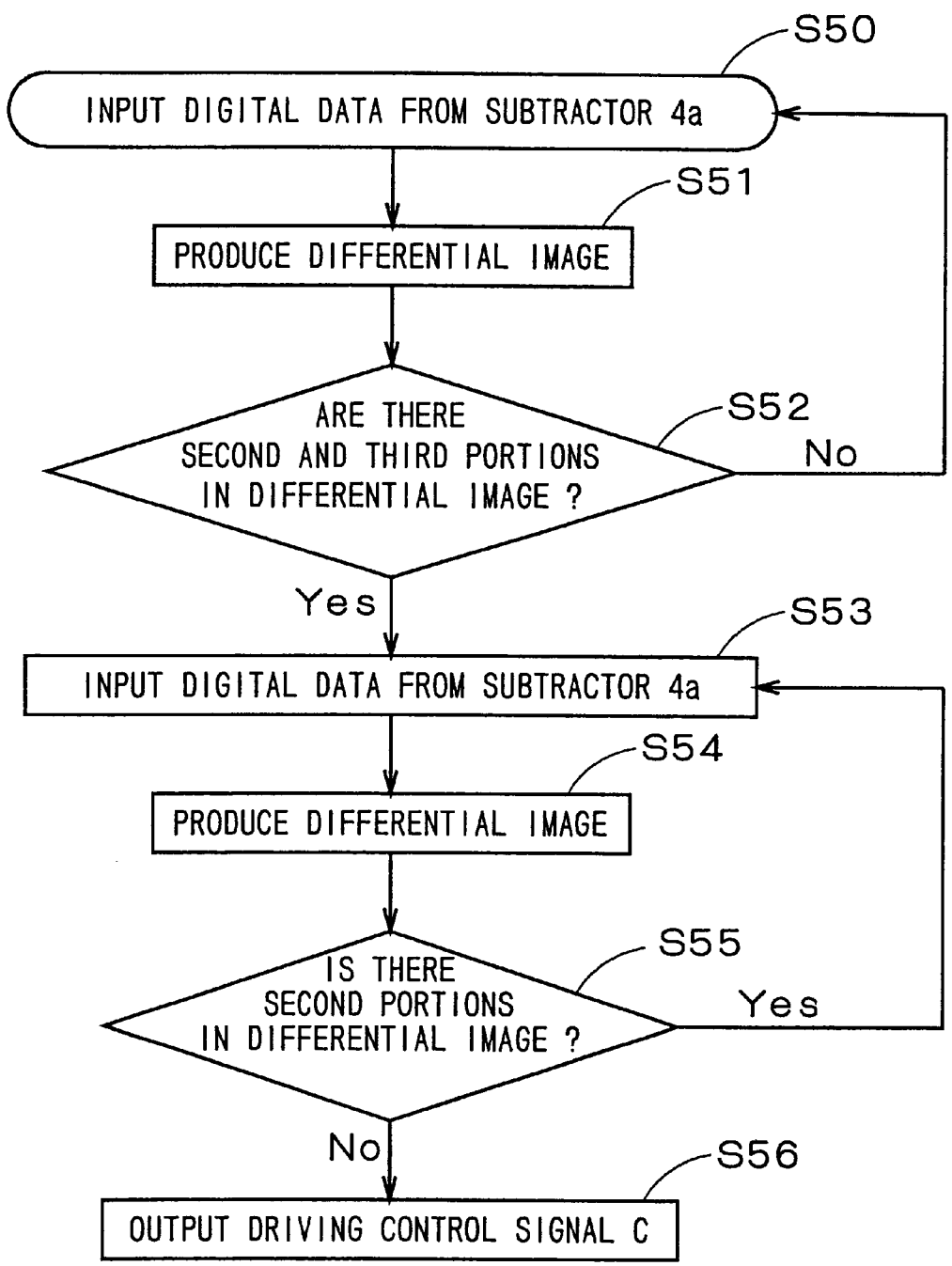
FIG. 24 is a flow chart of the operation of a data processing device.

FIG. 24 is a flow chart of the operation of the data processing device 5a. Referring to the drawing, we will give a concrete description of the operation. First, the data processing device 5a inputs digital data from the subtractor 4a (step S50). Then, on the basis of the entered digital data, the data processing device 5a produces a differential image by subtracting the initial image from the detected image (step S51).

Figure 25:
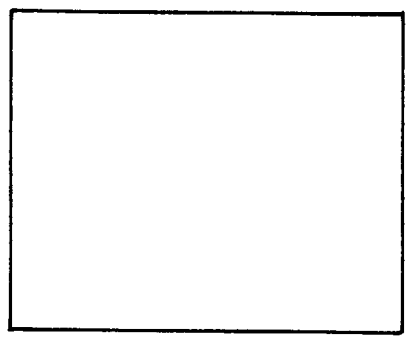
FIG. 25 shows a differential image obtained by subtracting the initial image from a detected image when no passerby is passing through the dual doors.

FIG. 25 shows a differential image obtained by subtracting the initial image in FIG. 21 from a detected image obtained when no passerby is passing through the dual doors (identical with the initial image in FIG. 21). In this case, digital data of each pixel in the detected image is identical with that in the initial image. Thus, all the digital data given by the subtraction by the subtractor 4a becomes "00000000".

Figure 26:
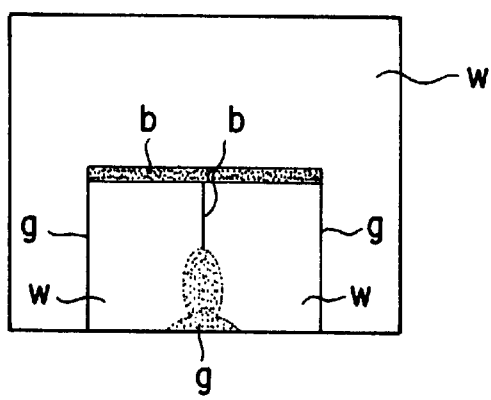
FIG. 26 shows a differential image obtained by subtracting the initial image from the detected image in FIG. 22.

FIG. 26 shows a differential image obtained by subtracting the initial image in FIG. 21 from the detected image in FIG. 22. The differential image in FIG. 26 roughly consists of three portions. A first portion is a portion that has not been changed from the initial image, for example, corresponding to an upper wall 9a above the first automatic door 1a. By the subtraction by the subtractor 4a, digital data of each pixel in the first portion becomes "00000000". This first portion is indicated by "w" in FIG. 26. A second portion is a portion that has been in the initial image but is eliminated by the opening of the first automatic door 1a (i.e., a portion that exits in the initial image but does not in the detected image), for example, corresponding to the wheel storage portion 10 in a central portion of the image. By the subtraction, digital data of each pixel in the second portion becomes a negative value. This second portion is indicated by "b" in FIG. 26. A third portion is a portion that is newly added to the initial image by the appearance of the passerby (i.e., a portion that does not exist in the initial image but does in the detected image), for example, corresponding to the passerby 7c. By the subtraction, digital data of each pixel in the third portion becomes a positive value. This third portion is indicated by "g" in FIG. 26.

Figure 27:
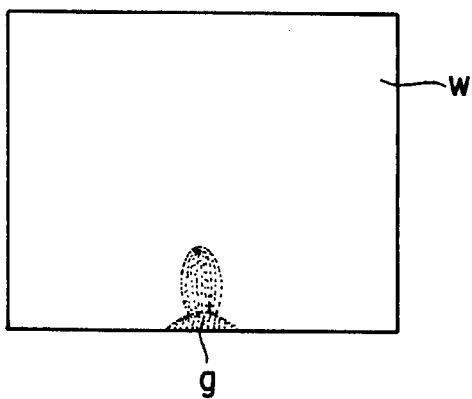
FIG. 27 shows a differential image obtained by subtracting the initial image from the detected image in FIG. 23.
Figure 28:
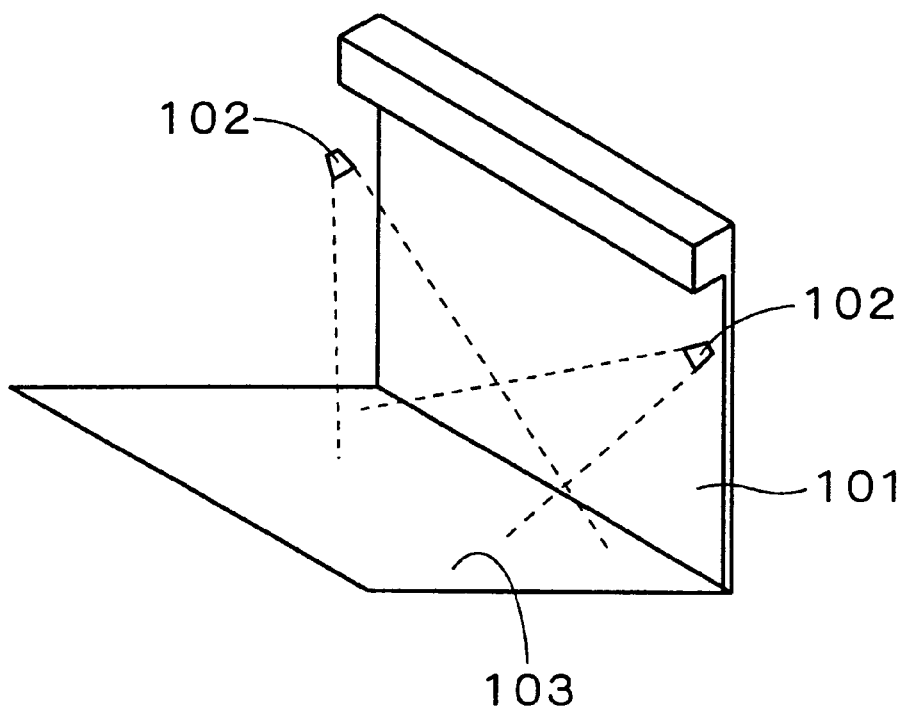
FIG. 28 is a schematic diagram of the structure of a conventional automatic door system.

FIG. 27 is a differential image obtained by subtracting the initial image in FIG. 21 from the detected image in FIG. 23. When the first automatic door 1a is closed completely, the second portion shown in the differential image in FIG. 26 disappears. Thus, the differential image in FIG. 27 consists of two portions, namely, the first portion and the third portion. In the detected image in FIG. 23, when the first automatic door 1a is completely closed, a vertical line appears between left and right doors of the first automatic door 1a which are now in contact with each other. However, digital data of this vertical line is generally much smaller than the digital data of the passerby 7c. Thus, the influence of this line is ignored in the differential image in FIG. 27.

Next, the data processing device 5a judges whether the aforementioned second and third portions appear or not in the produced differential image (step S52). Whether the second portion appears in a differential image or not can be judged according to whether any digital data of pixels constituting the differential image takes a negative value or not. Whether the third portion appears in a differential image or not can be judged according to whether any digital data of pixels constituting the differential image takes a positive value or not. When the second and the third portions appear in the differential image, the data processing device 5a judges that a passerby is on the way to pass through the first automatic door 1a and the first automatic door 1a is still open.

When the judgement at the step S52 shows that no second nor third portion appears in the differential image, the process returns to the step S50, at which the data processing device 5a inputs the next digital data from the subtractor 4a.

When the second and third portions appear in the differential image, on the other hand, the process proceeds to a step S53, at which the data processing device 5a inputs the next digital data from the subtractor 4a. Then, on the basis of the digital data entered at the step S53, the data processing device 5a produces a differential image in the same way as described above (step S54).

Next, the data processing device 5a judges whether the second portion appears in the differential image produced at the step S54 or not (step S55). When the second portion appears in the differential image (e.g. FIG. 26), the data processing device 5a judges that the first automatic door 1a is still open, and thus repeats the steps S53 to S55. When no second portion appears in the differential image (e.g. FIG. 27), on the other hand, the data processing device 5a judges that the first automatic door 1a is closed, and outputs the driving control signal C for opening the second automatic door 1b (step S56).

The driving control signal C is entered into the control device 6a. On receipt of the driving control signal C, the control device 6a drives and opens the second automatic door 1b.

In the automatic door system according to the fourth preferred embodiment of the present invention, when the second portion appears in the differential image produced at the step S54, the data processing device judges that the first automatic door is still open and does not output the driving control signal for opening the second automatic door. Therefore, the first and the second automatic doors are never opened at the same time. This effectively achieves the principal object of the dual doors, i.e., increasing efficiency of air-conditioning and preventing a strong wind to blow into the room.

While the invention has been described in detail, the foregoing description is in all aspects illustrative and not restrictive. It is understood that numerous other modifications and variations can be devised without departing from the scope of the invention.

We claim:

1. An automatic door system, comprising:
    a passable door for a movable passer; and
    a control portion for detecting a direction that said passer faces with respect to said door and for determining whether to allow said passer to pass through said door or not on the basis of said direction, wherein
        said passer is movable in a direction at least having either component of first and second axes which are orthogonal to each other;
        said passer is capable of passing through said door in a direction along said first axis; and
        said control portion measures a width of said passer along said second axis to detect a direction that said passer faces with respect to said door on the basis of said width.

2. The automatic door system according to claim 1, wherein
    said control portion further obtains a plurality of positions of said passer at a plurality of times to detect a moving direction of said passer on the basis of said plurality of positions.

3. The automatic door system according to claim 2, wherein
    said control portion further detects a moving speed of said passer on the basis of said plurality of times and said plurality of positions.

4. The automatic door system according to claim 1, wherein
    said control portion includes:
        image pickup means for taking a picture of the vicinity of an entrance of said door;
        data processing means for detecting the presence or absence of said passer in the vicinity of said entrance on the basis of a differential image which is obtained from an initial image obtained in an initial setting by said image pickup means and from a detected image obtained during operation of said door by said image pickup means,
        said data processing means, when said passer is in the vicinity of said entrance, outputting a driving control signal for driving said door depending on a direction that said passer faces with respect to said door; and
        driving means for receiving said driving control signal from said data processing means and driving said door.

5. The automatic door system according to claim 4, wherein
    said passer is movable in a direction at least having either component of first and second axes which are orthogonal to each other;
    said passer is capable of passing through said door in a direction along said first axis; and
    said data processing means measures a width of said passer along said second axis and compares the maximum value of widths and a predetermined threshold value to detect a direction that said passer faces with respect to said door.

6. The automatic door system according to claim 4, wherein
    when detecting the presence of said passer in the vicinity of said entrance, said data processing means obtains a plurality of said differential images from said initial image and a plurality of said detected images obtained at a plurality of times to detect a moving direction of said passer on the basis of a plurality of positions of the centers of gravity of said plurality of differential images.

7. The automatic door system according to claim 6, wherein
    when judging that said passer is moving to said door according to said moving direction, said data processing means detects a moving speed of said passer on the basis of said plurality of times and said plurality of positions of the centers of gravity.

8. The automatic door system according to claim 1, wherein the direction that said passer faces which respect to said door is based upon a comparison of a calculated value with a reference value.

9. An automatic door system, comprising:
    a passable door for a movable passer; and
    a control portion for detecting a direction that said passer faces with respect to said door and for determining whether to allow said passer to pass through said door or not on the basis of said direction, wherein
        said passer is movable in a direction at least having either component of first and second axes which are orthogonal to each other;
        said passer is capable of passing through said door in a direction along said first axis; and
        said control portion obtains a projection of said passer with respect to a fourth axis to detect a direction that said passer faces with respect to said door on the basis of variance of said projection, said fourth axis having a component of said first axis and a component of a third axis which is orthogonal to both of said first and second axes.

10. The automatic door system according to claim 9, wherein
    said control portion further obtains a plurality of positions of said passer at a plurality of times to detect a moving direction of said passer on the basis of said plurality of positions.

11. The automatic door system according to claim 10, wherein
    said control portion further detects a moving speed of said passer on the basis of said plurality of times and said plurality of positions.

12. The automatic door system according to claim 9, wherein said control portion includes:
    image pickup means for taking a picture of the vicinity of an entrance of said door;
    data processing means for detecting the presence or absence of said passer in the vicinity of said entrance on the basis of a differential image which is obtained from an initial image obtained in an initial setting by said image pickup means and from a detected image obtained during operation of said door by said image pickup means, said data processing means, when said passer is in the vicinity of said entrance, outputting a driving control signal for driving said door depending on a direction that said passer faces with respect to said door; and driving means for receiving said driving control signal from said data processing means and driving said door.

13. The automatic door system according to claim 12, wherein said passer is movable in a direction at least having either component of first and second axes which are orthogonal to each other;

said passer is capable of passing through said door in a direction along said first axis;

said data processing means obtains a projection of said passer with respect to a fourth axis and compares a variance value of said projection and a predetermined threshold value to detect a direction that said passer faces with respect to said door, said fourth axis having a component of said first axis and a component of a third axis which is orthogonal to both of said first and second axes.

14. The automatic door system according to claim 12, wherein when detecting the presence of said passer in the vicinity of said entrance, said data processing means obtains a plurality of said differential images from said initial image and a plurality of said detected images obtained at a plurality of times to detect a moving direction of said passer on the basis of a plurality of positions of the centers of gravity of said plurality of differential images.

15. The automatic door system according to claim 14, wherein when judging that said passer is moving to said door according to said moving direction, said data processing means detects a moving speed of said passer on the basis of said plurality of times and said plurality of positions of the centers of gravity.

16. The automatic door system according to claim 9, wherein the direction that said passer faces which respect to said door is based upon a comparison of a calculated value with a reference value.

17. An automatic door system comprising:

first and second doors located sequentially;

image pickup means for taking a picture of said first door; and a control portion for detecting an opening and closing state first door based on a differential image which is obtained from an initial image obtained in an initial setting by said image pickup means and from a detected image obtained during operation of said first and second doors by said image pickup means, and for determining whether to allow a passer that is passing through said first door toward said second door, to pass through said second door or not on the basis of said opening and closing state of said first door.

18. A method for controlling an automatic door, comprising the steps of:

(a) detecting a direction that a passer faces with respect to a door; and (b) determining whether to allow said passer to pass through said door or not on the basis of said direction, wherein said passer is movable in a direction at least having either component of first and second axes which are orthogonal to each other;

said passer is capable of passing through said door in a direction along said first axis; and at said step (a), a width of said passer along said second axis is measured to detect a direction that said passer faces with respect to said door on the basis of said width.

19. The method according to claim 18, wherein said step (b) includes the step of:

(b-1) obtaining a plurality of positions of said passer at a plurality of times to detect a moving direction of said passer on the basis of said plurality of positions.

20. The method according to claim 19, wherein said step (b) further includes the step of:

(b-2) detecting a moving speed of said passer on the basis of said plurality of times and said plurality of positions.

21. The method as claimed in claim 18, wherein said step of detecting the direction that the passer faces further comprises the step of comparing a calculated value with a reference value.

22. A method for controlling an automatic door, comprising the steps of:

(a) detecting a direction that a passer faces with respect to a door; and (b) determining whether to allow said passer to pass through said door or not on the basis of said direction, wherein said passer is movable in a direction at least having either component of first and second axes which are orthogonal to each other;

said passer is capable of passing through said door in a direction along said first axis; and at said step (a), a projection of said passer with respect to a fourth axis is obtained to detect a direction that said passer faces with respect to said door on the basis of variance of said projection, said fourth axis having a component of said first axis and a component of a third axis which is orthogonal to both of said first and second axes.

23. The method according to claim 22, wherein said step (b) includes the step of:

(b-1) obtaining a plurality of positions of said passer at a plurality of times to detect a moving direction of said passer on the basis of said plurality of positions.

24. The method according to claim 23, wherein said step (b) further includes the step of:

(b-2) detecting a moving speed of said passer on the basis of said plurality of times and said plurality of positions.

25. The method as claimed in claim 22, wherein said step of detecting the direction that the passer faces further comprises the step of comparing a calculated value with a reference value.

* * * * *